United States Patent
Dalton

[11] Patent Number: 6,016,796
[45] Date of Patent: Jan. 25, 2000

[54] FUEL BLENDING RATIO INFERRING METHOD

[75] Inventor: Joel Douglas Dalton, Ann Arbor, Mich.

[73] Assignee: Ford Global Technologies, Inc., Dearborn, Mich.

[21] Appl. No.: 09/016,990

[22] Filed: Feb. 20, 1998

[51] Int. Cl.$^7$ ................................ F02D 41/00
[52] U.S. Cl. .................... 123/695; 123/1 A; 123/575
[58] Field of Search .................... 123/1 A, 575, 123/695, 406.31

[56] References Cited

U.S. PATENT DOCUMENTS

| | | | |
|---|---|---|---|
| 4,594,968 | 6/1986 | Degobert et al. | 123/1 A |
| 4,945,881 | 8/1990 | Gonze et al. | 123/1 A |
| 4,945,882 | 8/1990 | Brown et al. | 123/1 A |
| 5,172,655 | 12/1992 | Forgacs | 123/1 A |
| 5,195,497 | 3/1993 | Yoshida et al. | |
| 5,253,631 | 10/1993 | Curran . | |
| 5,515,280 | 5/1996 | Suzuki | 123/406.31 |
| 5,850,824 | 12/1998 | Seitz et al. | 123/1 A |
| 5,881,703 | 3/1999 | Nankee, II et al. | 123/1 A |
| 5,901,671 | 5/1999 | Huff et al. | 123/1 A |

*Primary Examiner*—Erick R. Solis
*Attorney, Agent, or Firm*—Allan J. Lippa

[57] ABSTRACT

A fuel blending ratio inferring method responsive to an air/fuel feedback control system for an internal combustion engine is disclosed having a feedback correction loop generating a feedback variable derived from an output of an exhaust gas sensor. A fuel blending ratio is inferred in response to a refueling indication by observing the size and magnitude of the feedback variable. Thus, the effect of the fuel blend can be isolated from other errors in the feedback control system.

17 Claims, 3 Drawing Sheets

FUEL BLENDING RATIO INFERRING METHOD

FIELD OF THE INVENTION

The present invention relates to a fuel blending ratio inferring method.

BACKGROUND OF THE INVENTION

Fuels other than gasoline and diesel are increasingly being used as an energy source for internal combustion engines because of possible reduction in certain regulated emissions. In particular, alcohol and gasoline blends are commonly encountered. The engine air/fuel ratio control system must be able to detect these blends and make adjustments to the engine control parameters in order to maintain optimum operation.

Fuel blending ratio inferring methods are known in which the feedback correction term of the air/fuel ratio control system is monitored. Typical air/fuel ratio control systems use exhaust gas sensors to measure the exhaust air/fuel ratio. If the exhaust sensor indicates the exhaust air/fuel ratio is rich of the desired air/fuel ratio, commonly stoichiometry, then a negative feedback correction term is added to the fuel injected into the engine until the exhaust air/fuel ratio matches the desired air/fuel ratio. Similarly, if the exhaust sensor indicates the exhaust air/fuel ratio is lean of the desired air/fuel ratio, then a positive feedback correction term is added to the fuel injected into the engine until the exhaust air/fuel ratio matches the desired air/fuel ratio. In this way, the measured exhaust air/fuel ratio is made to follow the desired air/fuel ratio.

The fuel blending ratio inferring methods coupled to the above described air/fuel ratio control systems are based on the relationship between the blending ratio and the stoichiometric air/fuel ratio. As the blending ratio changes, and thus the chemical makeup of the fuel changes, the stoichiometric air/fuel ratio changes. When the air/fuel control system uses exhaust gas sensors to maintain stoichiometric combustion, the feedback term will compensate for the change in the stoichiometric air/fuel ratio. By monitoring the size and magnitude of this feedback term, an estimate of the blending ratio can be made. Such a system is disclosed in the U.S. Pat. No. 5,195,497.

The inventors herein have recognized numerous problems with the above approaches. One problem is that errors introduced by the fuel metering system and the air metering system cannot be differentiated from changes in the blending ratio. Stated another way, the feedback term will correct for such errors and also correct for a change in the stoichiometric air/fuel ratio caused by changes in fuel blend. Thus, inferring the blending ratio from the feedback term may result in errors and less than optimal engine operation.

SUMMARY OF THE INVENTION

An object of the invention claimed herein is to provide a method to infer the fuel blending ratio with minimal effects from errors introduced by the air and fuel metering systems.

The above object is achieved, and problems of prior approaches overcome, by a fuel blending ratio inferring method for an internal combustion engine coupled to a fuel tank comprising the steps of: providing an air/fuel error from an exhaust gas sensor; creating a refueling indication; and computing an inferred fuel blending ratio from the air/fuel error in response to said refueling indication.

An advantage of the above aspect of the invention is that the air/fuel ratio control system can remove fuel and air metering errors during the period where the fuel blend is constant, i.e. when no fuel is being added or subtracted from the fuel tank. Then, once the air/fuel ratio control system determines and compensates for these errors and a possible blend ratio change is detected, the blend ratio effect can be isolated and more accurately measured. Stated in another way, the advantage is that fuel and air metering errors can be differentiated from changes in the fuel blending ratio because the fuel blending inferences is made only where there is a possible change in the actual fuel blending ratio, which can only happen when fuel is added or removed from the fuel tank. This leads to a more accurate and reliable fuel blending ratio inference.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF AN EMBODIMENT

Figure 1:
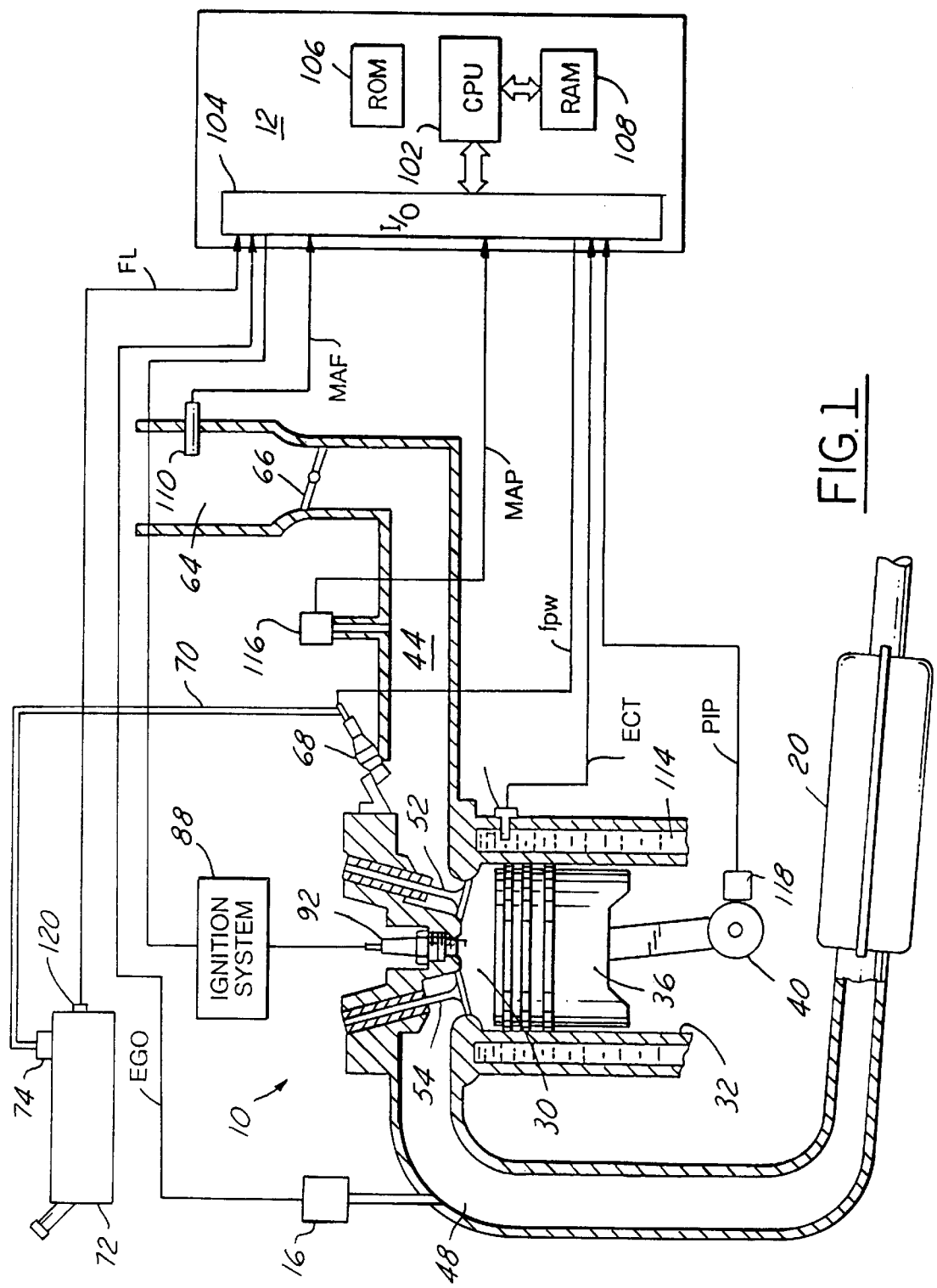
FIG. 1 is a block diagram of an embodiment in which the invention is used to advantage.

Internal combustion engine 10 comprising a plurality of cylinders, one cylinder of which is shown in FIG. 1, is controlled by electronic engine controller 12. Catalytic type exhaust gas oxygen sensor 16 is shown coupled to exhaust manifold 48 of engine 10 upstream of catalytic converter 20. Sensor 16 provides signal EGO to controller 12 which converts it into two-state signal EGOS. A high voltage state of signal EGOS indicates exhaust gases are rich of a desired air/fuel ratio and a low voltage state of signal EGOS indicates exhaust gases are lean of the desired air/fuel ratio. Typically, the desired air/fuel ratio is selected as stoichiometry which falls within the peak efficiency window of catalytic converter 20. In general terms which are described later herein with particular reference to FIGS. 2–4, controller 12 provides engine air/fuel feedback control in response to signals EGOS.

Continuing with FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54.

Intake manifold 44 is shown communicating with throttle body 64 via throttle plate 66. Intake manifold 44 is also shown having fuel injector 68 coupled thereto for delivering liquid fuel in proportion to the pulse width of signal fpw from controller 10. Fuel is delivered to fuel injector 68 by a conventional fuel system including a fuel tank 72, fuel pump 74, and fuel rail 70.

Conventional distributorless ignition system 88 provides ignition spark to combustion chamber 30 via spark plug 92 in response to controller 12.

Controller 12 is shown in FIG. 1 as a conventional microcomputer including: microprocessor unit 102, input/output ports 104, electronic memory chip 106 which is an electronically programmable memory in this particular example, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling sleeve 114; a measurement of manifold pressure (MAP) from manifold pressure sensor 116 coupled to intake manifold 44; a profile ignition pickup signal (PIP) from Hall effect sensor 118 coupled to crankshaft 40; and fuel level sensor signal FL from fuel sensor 120 coupled to fuel tank 72.

Figure 2:
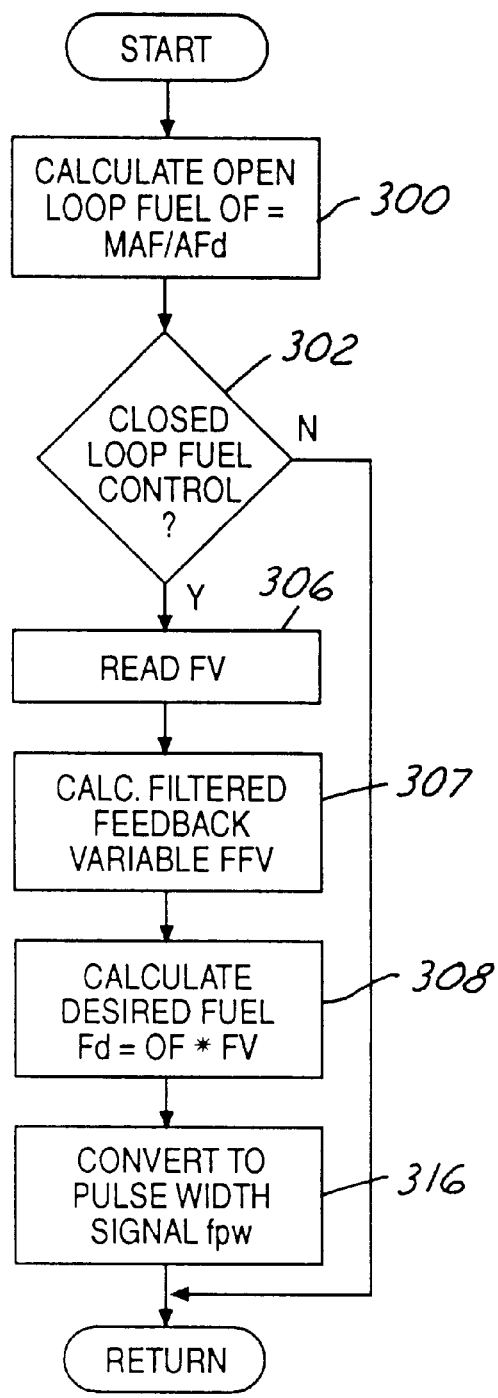
FIGS. 2–4 are flowcharts showing processes performed by a portion of the embodiment shown in FIG. 1.

The liquid fuel delivery routine executed by controller 12 for controlling engine 10 is now described beginning with reference to the flowchart shown in FIG. 2. An open loop calculation of desired liquid fuel (signal OF) is calculated in step 300. More specifically, the measurement of inducted mass airflow (MAF) from sensor 110 is divided by desired air/fuel ratio AFd which, in this example, is correlated with stoichiometric combustion and the fuel blending ratio.

A determination is made that closed loop or feedback control is desired (step 302) by monitoring engine operating parameters such as temperature ECT. Feedback variable FV (step 306) is then read from the subroutines described later herein with reference to FIG. 3. Filtered feedback variable FFV is then calculated (step 307) by filtering feedback variable FV. Filtered feedback variable FFV is used by the subroutine described later herein with reference to FIG. 4. Desired fuel quantity, or fuel command, for delivering fuel to engine 10 is generated by dividing feedback variable FV into the product of previously generated open loop calculation of desired fuel (signal OF) as shown in step 308. Fuel command or desired fuel signal Fd is then converted to pulse width signal fpw (step 316) for actuating fuel injector 68.

Controller 12 executes an air/fuel feedback routine to generate feedback variable FV as now described with reference to the flowchart shown in FIG. 3. Initial conditions which are necessary before feedback control is commenced, such as temperature ECT being above a preselected value, are first checked in step 500.

Figure 3:
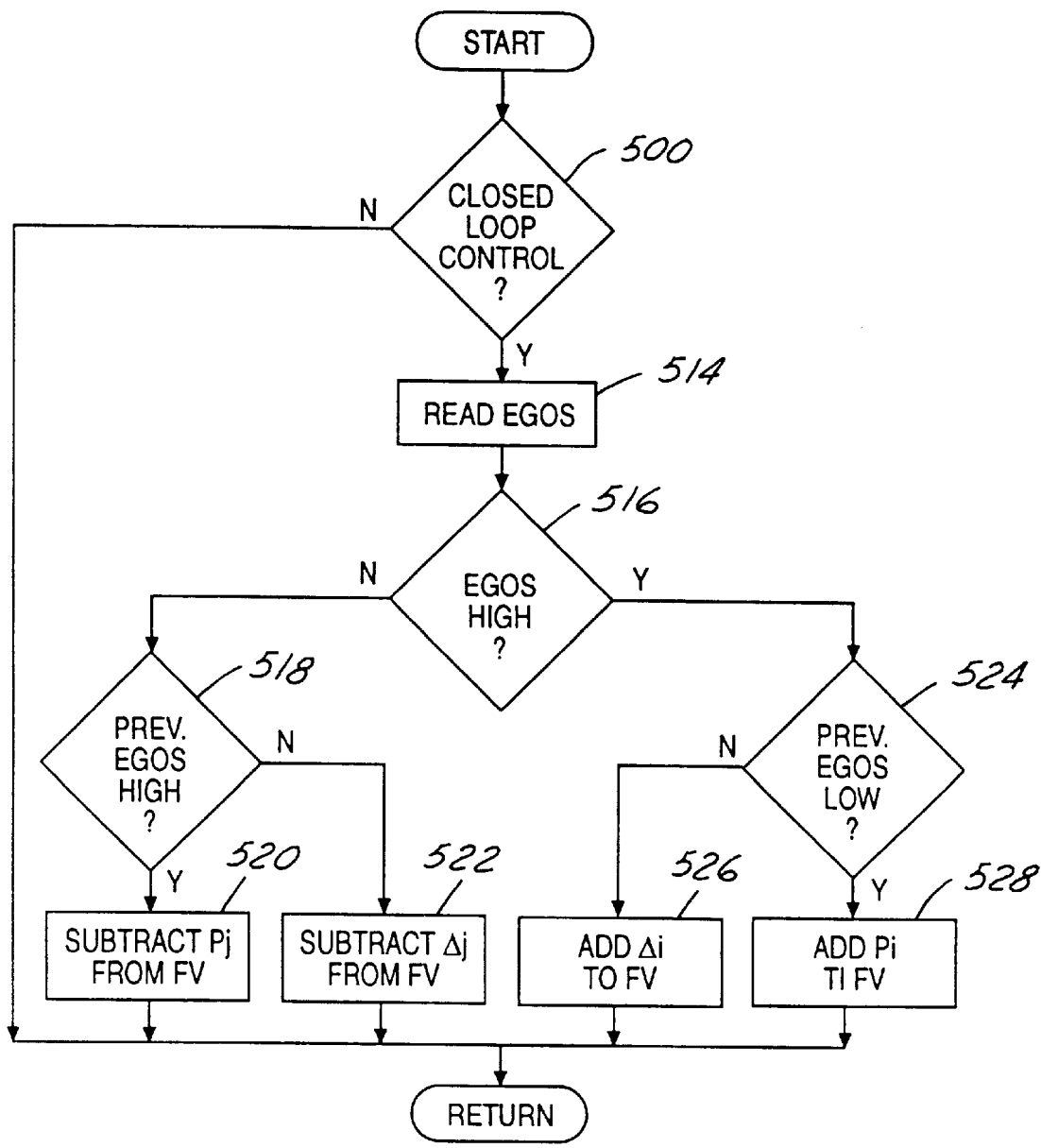

Continuing with FIG. 3, when signal EGOS is low (step 516), but was high during the previous background loop of controller 12 (step 518), preselected proportional term Pj is subtracted from feedback variable FV (step 520). When signal EGOS is low (step 516), and was also low during the previous background loop (step 518), preselected integral term $\Delta j$, is subtracted from feedback variable FV (step 522).

Similarly, when signal EGOS is high (step 516), and was also high during the previous background loop of controller 12 (step 524), integral term $\Delta i$ is added to feedback variable FV (step 526). When signal EGOS is high (step 516), but was low during the previous background loop (step 524), proportional term Pi is added to feedback variable FV (step 528).

In accordance with the above described operation, feedback variable FV is generated each background loop of controller 12 by a proportional plus integral controller (PI) responsive to exhaust gas oxygen sensor 16. The integration steps for integrating signal EGOS in a direction to cause a lean air/fuel correction are provided by integration steps $\Delta i$, and the proportional term for such correction provided by $P_i$. Similarly integral term $\Delta j$ and proportional term Pj cause rich air/fuel correction.

Figure 4:
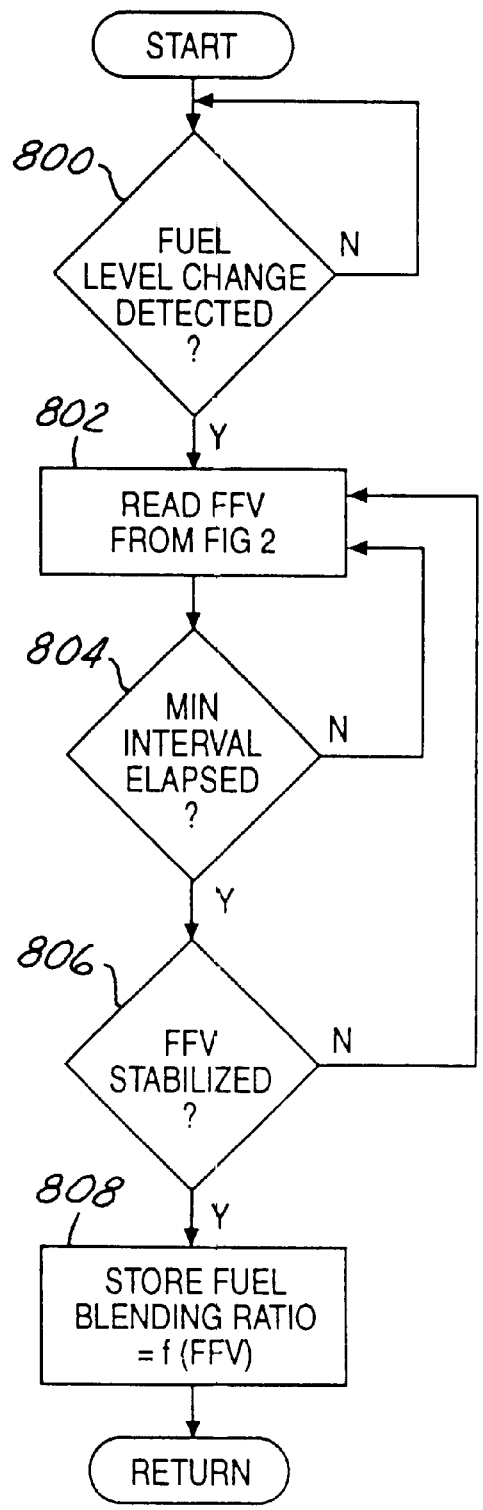

Referring now to FIG. 4, the routine for inferring the fuel blend ratio is now described. More specifically, the subroutine measures the effect of new fuel added during refueling operation on feedback variable FV. In this particular example, when the subroutine is called, filtered feedback variable FFV is read (step 802) when there is a change in the fuel tank level (step 800). Changes in fuel level are detected by fuel level sensors in fuel tank 70. Other methods for indicating refueling are well known such as fuel tank pressure sensors (not shown) or fuel nozzle deflectors (not shown). When filtered feedback variable FFV has been monitored for a predetermined minimum interval (step 804) and has reached a stabilized value (step 806), then the fuel blending ratio is set equal to a predetermined function of filtered feedback variable FFV (step 808). The predetermined minimum interval may be either a time interval or an interval corresponding to usage of a predetermined amount of fuel.

With knowledge of the blending ratio, the engine control system adjusts the desired air/fuel ratio AFd, ignition spark timing, and many other engine operating parameters to meet regulated emissions, maximize fuel economy, and maintain driveability.

An advantage of inferring the fuel blending ratio only when there is a possible change in the actual fuel blending ratio, i.e. during a refueling operation, is that errors in the fuel and air metering systems can be learned and corrected when the fuel blending ratio is constant and the fuel blending ratio can be inferred only when it has an dynamic effect. In this way it is possible to maximize the sensitivity and accuracy of a fuel blending ratio inferring method using a feedback air/fuel ratio control system.

This concludes the description of the Preferred Embodiment. The reading of it by those skilled in the art would bring to mind many alterations and modifications without departing from the spirit and scope of the invention. For example, multiple exhaust gas oxygen sensors and air/fuel feedback controllers may be used to advantage such as one for each bank of an engine. Accordingly, it is intended that the scope of the invention be limited by the following claims.

What is claimed:

1. An air/fuel ratio control method for an internal combustion engine coupled to a fuel tank, the method comprising the steps of:

determining an air/fuel error from an exhaust gas sensor;

providing an interval in response to a refueling indication;

computing a fuel blending ratio from said air/fuel error during said interval; and delivering fuel to the engine based on said air/fuel error and said fuel blending ratio.

2. The method recited in claim 1 wherein an alternative fuel in the fuel blend comprises methanol.

3. The method recited in claim 1 wherein an alternative fuel in the fuel blend comprises alcohol.

4. The method recited in claim 1 wherein said refueling indication comprises a difference between successive fuel level measurements.

5. The method recited in claim 1 wherein said interval comprises a predetermined time interval.

6. The method recited in claim 1 wherein said interval comprises an interval corresponding to usage of predetermined amount of fuel.

7. The method recited in claim 1 wherein said interval ends when said fuel blending ratio reaches a stabilized value.

8. A fuel delivery method for an internal combustion engine coupled to a fuel tank, the method comprising the steps of:

determining an air/fuel error from an exhaust gas sensor;

providing an interval in response to a refueling indication;

computing a fuel blending ratio from said air/fuel error during said interval;

determining a desired air/fuel ratio based on said fuel blending ratio; and delivering fuel to the engine based on said air/fuel error, said fuel blending ratio, and said desired air/fuel ratio.

9. The method recited in claim 8 wherein an alternative fuel in the fuel blend comprises methanol.

10. The method recited in claim 8 wherein an alternative fuel in the fuel blend comprises alcohol.

11. The method recited in claim 10 wherein said refueling indication comprises a difference between successive fuel level measurements.

12. The method recited in claim 11 wherein said interval comprises a predetermined time interval.

13. The method recited in claim 11 wherein said interval comprises an interval corresponding to usage of predetermined amount of fuel.

14. The method recited in claim 13 wherein said interval ends when said fuel blending ratio reaches a stabilized value.

15. An article of manufacture comprising:

a computer storage medium having a computer program encoded therein for controlling an air/fuel ratio of an internal combustion engine coupled to a fuel tank, said computer storage medium comprising:

code for determining an air/fuel error from an exhaust gas sensor;

code for providing an interval in response to a refueling indication;

code for computing a fuel blending ratio from said air/fuel error during said interval; and code for delivering fuel to the engine based on said air/fuel error and said fuel blending ratio.

16. The article recited in claim 15 wherein said refueling indication comprises a difference between successive fuel level measurements.

17. The article recited in claim 15 wherein said interval comprises a predetermined time interval.

* * * * *